United States Patent
Trainin et al.

(10) Patent No.: US 6,757,802 B2
(45) Date of Patent: Jun. 29, 2004

(54) METHOD FOR MEMORY HEAP AND BUDDY SYSTEM MANAGEMENT FOR SERVICE AWARE NETWORKS

(75) Inventors: Ehud Trainin, Jerusalem (IL); Assaf Zeira, Shoham (IL)

(73) Assignee: P-Cube Ltd., Hertzliya (IL)

( * ) Notice: Subject to any disclaimer, the term of this patent is extended or adjusted under 35 U.S.C. 154(b) by 490 days.

(21) Appl. No.: 09/824,970

(22) Filed: Apr. 3, 2001

(65) Prior Publication Data

US 2002/0144073 A1 Oct. 3, 2002

(51) Int. Cl.[7] .................. G06F 12/00; G06F 12/06
(52) U.S. Cl. ............. 711/170; 711/171; 711/172; 711/173; 711/209; 707/205
(58) Field of Search ................. 711/170, 171, 711/172, 173, 154, 209; 707/205; 713/1, 100; 710/104

(56) References Cited

U.S. PATENT DOCUMENTS

| | | | | |
|---|---|---|---|---|
| 5,625,819 A | * | 4/1997 | Hoffer, Jr. ............. | 707/202 |
| 5,742,793 A | * | 4/1998 | Sturges et al. ........... | 711/152 |
| 5,835,959 A | * | 11/1998 | McCool et al. .......... | 711/171 |
| 5,930,827 A | * | 7/1999 | Sturges ................... | 711/170 |
| 6,131,150 A | * | 10/2000 | DeTreville ............... | 711/173 |
| 6,247,105 B1 | * | 6/2001 | Goldstein et al. ........ | 711/170 |
| 6,442,661 B1 | * | 8/2002 | Dreszer .................. | 711/170 |
| 6,505,283 B1 | * | 1/2003 | Stoney .................... | 711/170 |
| 6,542,978 B2 | * | 4/2003 | Goldstein et al. ........ | 711/170 |
| 2002/0069324 A1 | * | 6/2002 | Gerasimov et al. ..... | 711/114 |

* cited by examiner

*Primary Examiner*—Mano Padmanabhan
*Assistant Examiner*—Jasmine Song
(74) *Attorney, Agent, or Firm*—Edward Langer; Shiboleth, Yisraeli, Roberts, Zisman & Co.

(57) ABSTRACT

A computer system for allocating memory comprises a central processing unit (CPU) for controlling said system, a local memory for said CPU, means for allocating a plurality of memory blocks to tasks executed on said CPU, and block headers for said memory blocks. The block header further comprises a free block header comprising addresses of free memory blocks designated by the free block header, and further comprising an allocated block header including addresses of allocated memory blocks designated by said allocated block header.

14 Claims, 6 Drawing Sheets

Free Block Header 300

Allocated Block Header 360

| Block Size | Initial Address | Level 1 | Level 2 | Level 3 | Address |
|---|---|---|---|---|---|
| 2048 | Null Address | n/a | n/a | n/a | Next |
|  |  | n/a | n/a | n/a | Previous |
| 1024 | 3072 | Null address | n/a | n/a | Next |
|  |  | Null address | n/a | n/a | Previous |
| 512 | 1536 | Null address | n/a | n/a | Next |
|  |  | Null address | n/a | n/a | Previous |
| 256 | 2304 | Null address | n/a | n/a | Next |
|  |  | Null address | n/a | n/a | Previous |
| 128 | Null Address | n/a | n/a | n/a | Next |
|  |  | n/a | n/a | n/a | Previous |

Fig. 8

| Block Size | Initial Address | Level 1 | Level 2 | Level 3 | Address |
|---|---|---|---|---|---|
| 2048 | Null Address | n/a | n/a | n/a | Next |
|  |  | n/a | n/a | n/a | Previous |
| 1024 | 3072 | 1024 | Null address | n/a | Next |
|  |  | Null address | 3072 | n/a | Previous |
| 512 | 2560 | Null address | n/a | n/a | Next |
|  |  | Null address | n/a | n/a | Previous |
| 256 | 2304 | Null address | n/a | n/a | Next |
|  |  | Null address | n/a | n/a | Previous |
| 128 | 2432 | Null address | n/a | n/a | Next |
|  |  | Null address | n/a | n/a | Previous |

Fig. 9

METHOD FOR MEMORY HEAP AND BUDDY SYSTEM MANAGEMENT FOR SERVICE AWARE NETWORKS

FIELD OF THE INVENTION

The present invention relates generally to computer memory systems, where memory is allocated in blocks of varying sizes, as may be necessary for the execution of certain portions of the application being executed on the computing system. More specifically, the invention relates to the management of memory heaps where memory is partitioned into smaller portions on a binary basis and where neighboring blocks of equal size, also known as "buddies" may be recombined to create a larger block.

BACKGROUND OF THE INVENTION

Memory management systems for processing units handling multiple tasks are required to handle the memory needs of each task as they are swapped in and out of memory. The different tasks may require various sizes of memory space during various times of their execution period. Hence, memory needs are dynamic and may grow or shrink over time. In addition, when the task is complete, the memory associated with its execution may be freed to be used by other tasks, which may require that additional memory be made available. A specific use of heap memories may be found in service aware networks (hereinafter "SAN") where a task may handle multiple process flows and require varying sizes of memory to handle the task.

A SAN is a network platform capable of making application-level decisions based on packet-level communication. By knowledge of the application, its priorities, importance and other factors, packets may be routed more efficiently through the network system. A process flow is a stream of multiple packets, transferred over a network system, where all such packets are related to a particular process flow. Each process flow may require its own memory heap to handle its data needs, which may vary from one process flow to the next. Heap is an area of contiguous memory used for dynamic memory allocation where blocks of memory are allocated and freed in an arbitrary manner, and the pattern of allocation and the size of blocks is not known until run-time. A program may have one or more heaps, which it may use for several different purposes. Heaps are required by languages in which functions can create arbitrarily-sized data structures. In the C language, for example, the functions malloc( ) and free( ) assign and unassign memory portions for use as heap.

Efficient management of the memory requirements of the tasks is important for overall performance of the system in two respects. One is the amount of memory actually used for each task, and the other is the time it takes to allocate and de-allocate the memory assigned for a certain task. Furthermore, it is important for avoiding system fragmentation, which is associated with inefficient use of the memory.

Memory is allocated to tasks based on certain memory usage expectations. In the UNIX-based operating systems, applications utilize the malloc( ) instruction, referenced hereinabove, to allocate memory to a task. The instruction free( ) is used to free such memory for use by other tasks, and realloc( ) is used to change the size of a previously assigned memory block.

Figure 1:
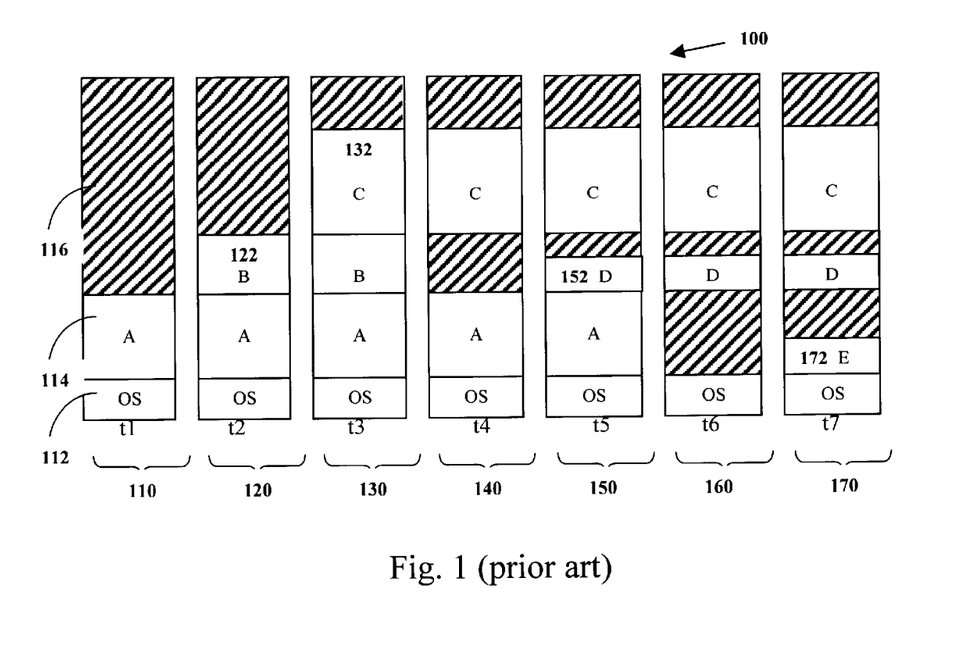
FIG. 1 is a diagram of a prior art method for managing tasks entering and leaving memory over a period of time.

Prior art FIG. 1 shows an example of how memory allocation of various tasks changes during a sequence of time slots 110–170. In time slot t1 110, an operating system (hereinafter "OS") 112 is shown resident in memory, as is the space allocated for task A 114. During time slot t2 120 an additional task B 122 requiring memory of a different size is allocated into the memory available immediately adjacent to the memory allocated for task A 120. The same procedure is repeated when task C 132 is added in time slot t3 130. In time slot t4 140, task B 122 completes its use of memory and releases the memory, making it available for use by other tasks. In time slot t5 150, task D 152 occupies some, but not all, of the memory freed by task B 122. In time slot t6 160 task A 114 frees the memory allocated for its purposes and in time slot t7 170, task E 172 uses some of that space.

A few problematic consequences are clearly evident from this relatively simple sequence of memory allocation and reallocation processes. First, if task A would have required additional memory during time slots t2 120 or t3 130, it would have had to wait for additional contiguous memory to be made available. Secondly, as tasks go in and out of the memory system, the memory becomes increasingly fragmented, making it more difficult to place new tasks. Without more sophisticated memory management systems, the unusable portions of the memory can become significant and system performance can be degraded dramatically.

Figure 2:
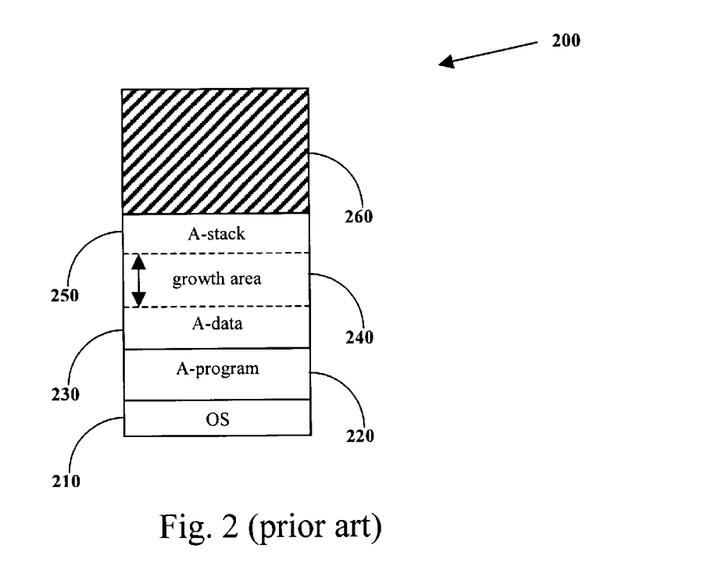
FIG. 2 is a diagram showing a prior art method of memory allocation for both data and stack growth.

In order to address the issue of the growth of memory needs for additional tasks over time, for both the data and stack portions, the prior art system 200 illustrated in FIG. 2 has been used. FIG. 2 illustrates memory allocation for both data and stack growth. A task may have several different portions to it. The first is the actual program 220, or the code that is executed by task A, which is usually of a fixed size. Both the data portion 230 and the stack portion 250 are likely to change memory sizes over the duration of the execution of their respective program 220. Therefore, in this method, certain additional memory space is allocated so that stack portion 250 and data portion 230 can grow into it. For efficiency purposes it would be advisable to have them grow into the same growth area 240, as shown in FIG. 2.

Memory allocation can be managed and tracked in basically three forms: bit maps, lists and buddy systems. When using bit maps, a portion of the memory is allocated so that every bit in the memory represents a corresponding block. The size of the block is important, as the smaller the block size, the larger is the corresponding bit map. Blocks that are in use are indicated by a logical "1" and unused block are indicated by a logical "0", or vice versa. While a simple system to implement, after some operational time the task of detecting a sequence of unused memory blocks becomes cumbersome and time consuming, reducing the overall efficiency of the system.

Lists manage the allocated and free portions of the memory by means of lists contained in a separate area of the memory. An entry into such a list contains: an indication as to whether the block is in use or not; the start address of the block in memory; the length of the block, typically in bytes; and a pointer to the next entry of the list. It is also possible to maintain two separate lists, one for allocated memory and the other for free memory. A list can be sorted by address, to allow for straightforward updating of the lists. Sorting by size is also possible, allowing an easier search for the best fit for the memory segment needed. A common algorithm for finding the memory segment to fit a task is first fit. In this case the list is searched until the first free memory segment that is big enough to fit the task is found. Unless that memory segment exactly fits the task in size, the segment is broken into two, one to fit the task needs and the other remains as free memory. Similarly a best fit algorithm may be used, finding the best fit in the list for the task at hand. In this case it would be advantageous to have the list of free memory sorted by size.

Literature suggests that the free memory segments can be used to place the list of information about the free memory segments. Hence, each free memory segment has the information of the size of the free memory segment and a pointer to the following entry. However, finding neighbors for de-allocation and recombination of memory is complex and relatively slow. Not performing de-allocation and recombination of memory regularly results in highly fragmented memory and reduced overall system performance.

Buddy systems are a subclass of strict segregated fit allocation mechanisms which make splitting and coalescing fast by pairing each block with a unique adjacent buddy block. There is an array of free-block lists, one for each allowable block size. Allocation rounds up the requested size to an allowable size, and allocates a free block from the corresponding free list. If the free list is empty, a larger block is selected and split. A block may only be split into pairs of buddies.

Also a block may only be coalesced with its buddy, and this is only possible if the buddy has not been split into smaller blocks. The advantage of buddy systems is that the buddy of a block being freed can be quickly found by a simple address computation. The disadvantage of buddy systems is that the restricted set of block sizes leads to high internal fragmentation, as does the limited ability to coalesce. Different sorts of buddy systems are distinguished by the available block sizes and the method of splitting. The most common is binary buddies, where the permitted sizes are powers of two.

The binary buddy system, takes advantage of the fact that computers use a binary address system in order to accelerate the merging of adjacent free memory segments. It further requires that memory blocks are always of a size that is a whole-number exponent of 2, i.e. 1, 2, 4, 8, . . . , 128, 256, . . . and so on. The system keeps track of lists for each possible block size. Initially the full size of the memory is free. When the first task requiring memory smaller than half of the free memory occurs, the block is split into two. The result is two blocks of memory of half the original size. One block is now checked against the task's memory needs and if those needs are less than half the block, then that block is split. Now there is no block of the original size, one block of half the original size, and two blocks of quarter the original size. This process will continue until the smallest block possible to fit the memory needs of the task is found.

The lists of free blocks and used blocks are updated accordingly at each step. One advantage of this system is that when a merge of blocks is necessary, a relatively short list of blocks of the same size needs to be searched in order to perform the task at hand, unlike a system which allows the split to occur on arbitrary borders. While the system is fast, it has the disadvantage that there are non-used portions of memory within an allocated block, as they may be allocated to a larger amount of memory then actually is needed by the task at hand.

Therefore, for these and other reasons not stated herein, there is a need in the art to provide an improved system for memory allocation management.

SUMMARY OF THE INVENTION

It is an object of the present invention to provide a method to increase the speed at which the merging of blocks can take place in a buddy system.

It is a further object of the present invention to provide a method for better utilization of memory in a buddy system.

These objectives and others not mentioned explicitly are achieved by the present invention by assigning different headers within the allocated block, according to the inventive method described, thereby providing an efficient pointing system for memory block usage. Moreover, the present invention allows buddy blocks to be merged efficiently, without the need for searching in lengthy tables.

Using the buddy system as the primary way of providing memory blocks to the tasks, the present invention further provides headers which are aligned with the block start address. Headers are used for both the free blocks as well as the used blocks of memory. However, different headers are used for allocated blocks and free blocks. Management of free blocks is accomplished by using a linked list of free blocks, where each block has a free block header.

In the present invention each data block is always assigned an address on its natural address boundary, i.e., the block always resides on an address divisible by the block size without a remainder.

The present invention will be more fully understood from the following detailed description of the preferred embodiments thereof, taken together with the drawings, in which:

DETAILED DESCRIPTION OF THE PREFERRED EMBODIMENT

The present invention is described in the following exemplary embodiment with respect to a memory system that allocates memory blocks to tasks being executed using such memory. The present invention is also particularly well-suited for use in a SAN, where packet processors handle a plurality of process-flows, each with its own memory requirements. In SANs, process-flow processing is accomplished at wire speed, or the speed in which packets are moved through the network, which is paramount to the overall performance of the system.

Figure 3:
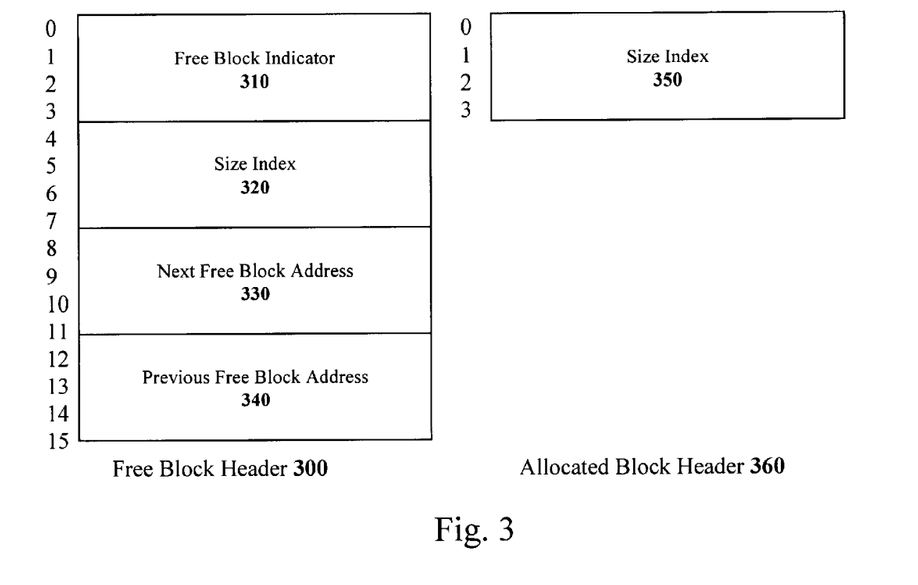
FIG. 3 is a diagram of allocated and non-allocated memory blocks, arranged in accordance with an exemplary embodiment of the present invention.

Using the buddy system as the primary way of allocating memory blocks to the tasks, the present invention adds headers aligned with the block start address. Headers are used for both the free blocks as well as the used blocks of memory. However, different headers are used for allocated blocks versus free blocks as shown in FIG. 3.

Free block header 300 contains several fields of information about the free memory block corresponding to this header. The free block indicator 310 is set to "0" to indicate that the memory block is free. In a 32-bit memory address system it is preferable that this value occupy four bytes for alignment purposes and ease of data addressing. The size index 320 contains the exponent value of the block that must be a number other than zero. However, due to the use of certain of the block area for information relative to the free block, the minimum size index value is 4, indicating that 16 bytes ($2^4$) are used for the block header. Hence the minimum size of a block in this embodiment is restricted to 16 bytes. This can be modified to larger block sizes if so desired, or in larger addressing systems, such as a 64-bit addressing system, and smaller, to some extent, in smaller addressing systems, such as a 16 bit address system, more common for microcontrollers. In addition, the next free block address 330 and the previous free block address 340 are included in the header for uses which will be explained hereinbelow.

Allocated blocks have only the size index 350 information hence conserving memory space for the actual content of the block. In addition, because the allocated block header 360 is always a non-zero value, it further differentiates between used and free memory blocks.

Figure 4:
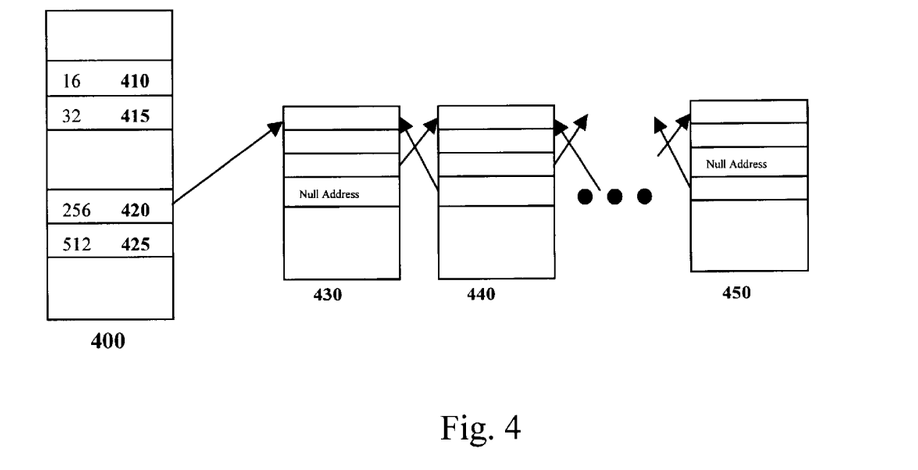
FIG. 4 is a diagram of block mapping and addressing, in accordance with an exemplary embodiment of the present invention.

Management of free blocks is done through a linked list of free blocks, each block having a free block header, as illustrated with reference to FIG. 4. A list of the permitted sizes of the free blocks, from the smallest to the largest, that may be allocated in the system is used as the root table 400. Each entry corresponds to a block size, for example 16 bytes 410, 32 bytes 415, 256 bytes 420, 256 bytes 425 and so on. Each such entry contains an address that points to the header of the first free block 430 of the size managed by that entry. If there is no free block corresponding to that size, a "null address" value is used.

For example, the value "0" may be used as the null address signaling to the system that the address does not point to a free block. The first free block header 430 points to the next free block 440, which in turn points to another free block, and so on until the pointer points to the last free block 450. The "null address" is placed in the "next free block address" of the last free block 450, thus indicating that there is no other free block of the same size after that last block. Similarly, the first free block of that same size 430 has its "previous free block address" set to the "null address", thus indicating that there is no other free block of the same size in front of this block. Therefore, when a search for a block of that size is made, and the corresponding address in the root table 400 is the "null address," then a free block of that size does not exist. It is therefore necessary to search for the next larger block size, and if such a block is free, to split that block so that the right size block is used for the task at hand. If a block of that size exists, then the first free block 430 pointed to by the root table 400 is used, and it is set as a used block. If that free block pointed to another free block of the same size, the pointer is used to address that block 440 and change the "previous free block address" to the "null address," and the corresponding entry of the root table 400 is set to point to the beginning of that block.

Similarly, when a block of the same size is freed, its header is set such that it becomes the first free block available for use. The "previous free block address" of what was the first free block is set to point to the newly free block, the "next free block address" is updated to point to the former first free block, the "previous free block address" of the new free block is set to the "null address" and the entry corresponding to the respective free block size is set to point to the beginning of the newly assigned free block. Clearly, a person skilled in the art could easily place the newly freed block as the new last free block, or for that purpose at any random location in between existing free blocks of the same size.

Figure 5:
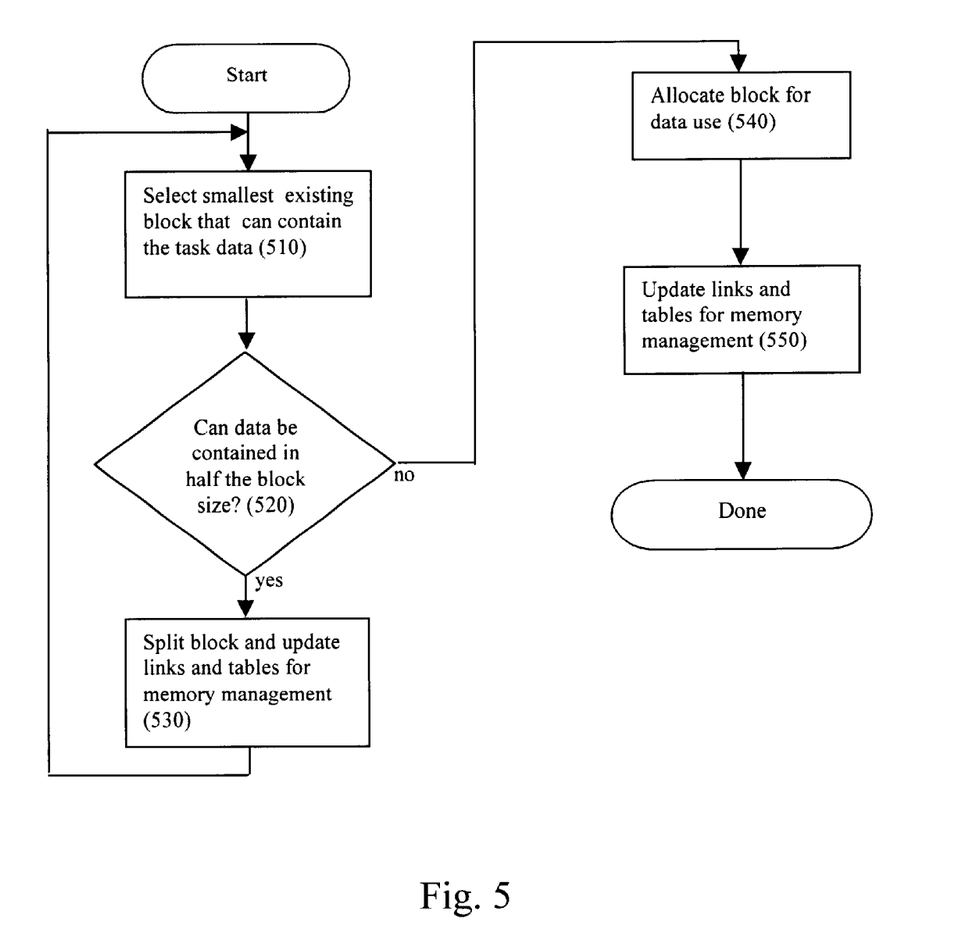
FIG. 5 is a flow chart of a block allocation process, in accordance with an exemplary embodiment of the present invention.

With reference to FIG. 5, the steps necessary to achieve the task of allocating a free block for use are described as follows: First, the smallest existing free block available, which fits the task, is located 510. For example, if the task requires a 275 byte data storage and the smallest available greater block is 512 bytes then this block is used 520. As the data cannot reside in a smaller block size, which is always half the size of the previous step, then the block is allocated 540 and the links to the block are updated 550 in the manner explained above for using a free memory block. In another case the smallest block available may be 1024 bytes and therefore when checked 520 it is clear that a smaller block size can be used. The free block is then split into two and removed from the list of that size of free blocks 530 and two free blocks of the size of 512 bytes are available now. The process starts again 510 and a fit is found. If necessary, such splits may require a few iterations of step 520 until the smallest available block is found. It should be noted though, that this is only one way of implementing such a memory allocation and this invention is not restricted to the use of this example only.

As mentioned hereinabove, it is important to periodically locate free blocks and merge them back into larger blocks in order to increase efficiency and reduce fragmentation. In the present invention each data block is always assigned an address on its natural address boundary, i.e., the block always resides on an address divisible by the block size without a remainder. For example, blocks of the size of 256 bytes are always on addresses such as 3072, 11,520, etc., while blocks of the size of 1024 bytes always reside on address such as 4096, 73,728, etc. When a binary address system is used, the headers of two aligned neighboring blocks differ in only one bit, while all other bits are identical. An example is discussed below.

Figure 6:
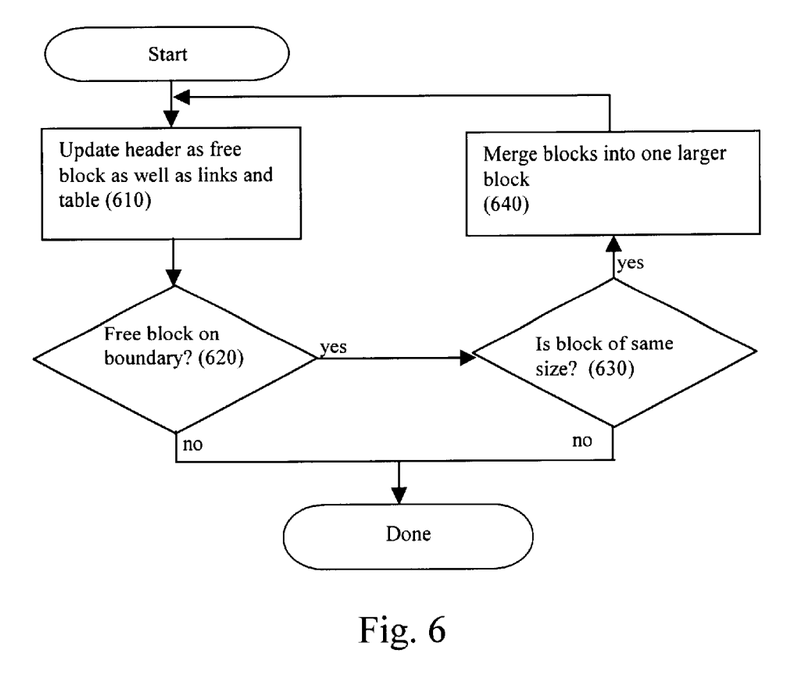
FIG. 6 is a flow chart of a block de-allocation process, in accordance with an exemplary embodiment of the present invention.

FIG. 6 is a flow chart of the block de-allocation process, in accordance with an exemplary embodiment of the present invention. The process of freeing a block and merging, if possible, is described in FIG. 6. First, the newly freed block headers are assigned as explained above. Then the system checks if there is a free block on the boundary 620, and if it is of the same size 630. Practically this can be done easily because only one bit needs to be changed from either "1" to "0" or from "0" to "1" in order to check the header of the corresponding aligned block. If the first block does not fit the size and alignment of the second block then no such merge can take place. However, if the headers are found to be compatible, i.e., both blocks are of the same size, and they are on the alignment boundary such that the address to the header differs by only one bit, corresponding to the block size index, then the blocks may be merged 640.

When this is done, the two blocks are removed from the list of the free blocks in the free blocks lists. This can be done because both the "next free block address" and the "previous free block address" are available in each header. The free blocks remaining are updated such that the link between the free blocks of the same size is connected again. The new merged block is now added to the beginning of the larger free blocks as explained above. While the merge of the free block with a corresponding aligned block of the same size can be performed immediately upon its release, other methods may be employed. Clearly, a person skilled-in-the-art could easily place the newly merged block as the new last free block, or for that purpose at any random location in between existing free blocks of the same size.

For example, a method using the disclosed merger technique might be performed only after a certain interval of time has elapsed. Another possibility, is to begin the merge upon a specific trigger, such as the inability to find a large enough data block for the task, thus indicating memory fragmentation. Yet another alternative embodiment is to have the first block of a given size begin at an arbitrary address. All other blocks corresponding to that first block thereafter begin at addresses which are a modulo of the initial address. For example, the first block of the size 256 may begin at address 3333, which is clearly not an aligned address as explained above but rather is an arbitrary address. Other blocks of the same size may appear at an address such as 2821 (two modulo numbers away) or 4613 (five modulo numbers away). All the calculations for identifying an address location preferably take into account the modulo number before proceeding. The advantage of the method described is that it is neither necessary to maintain nor search lists as suggested by prior art, thus allowing for a faster memory heap management system, at the relatively small price of allocating several bytes for the headers. One of ordinary skill in the art can easily expand this block allocation and address alignment system such that the minimal block size available would be of an arbitrary size and the larger blocks would be a multiplication of the smallest block size multiplied by a number which is a power of 2. For example, if the smallest possible block size were 20 bytes, then the blocks available would be 20, 40, 80, 160 etc., and when the smallest size block available would be 25 bytes, then the blocks available would be 25, 50, 100, 200, etc.

Figure 7:
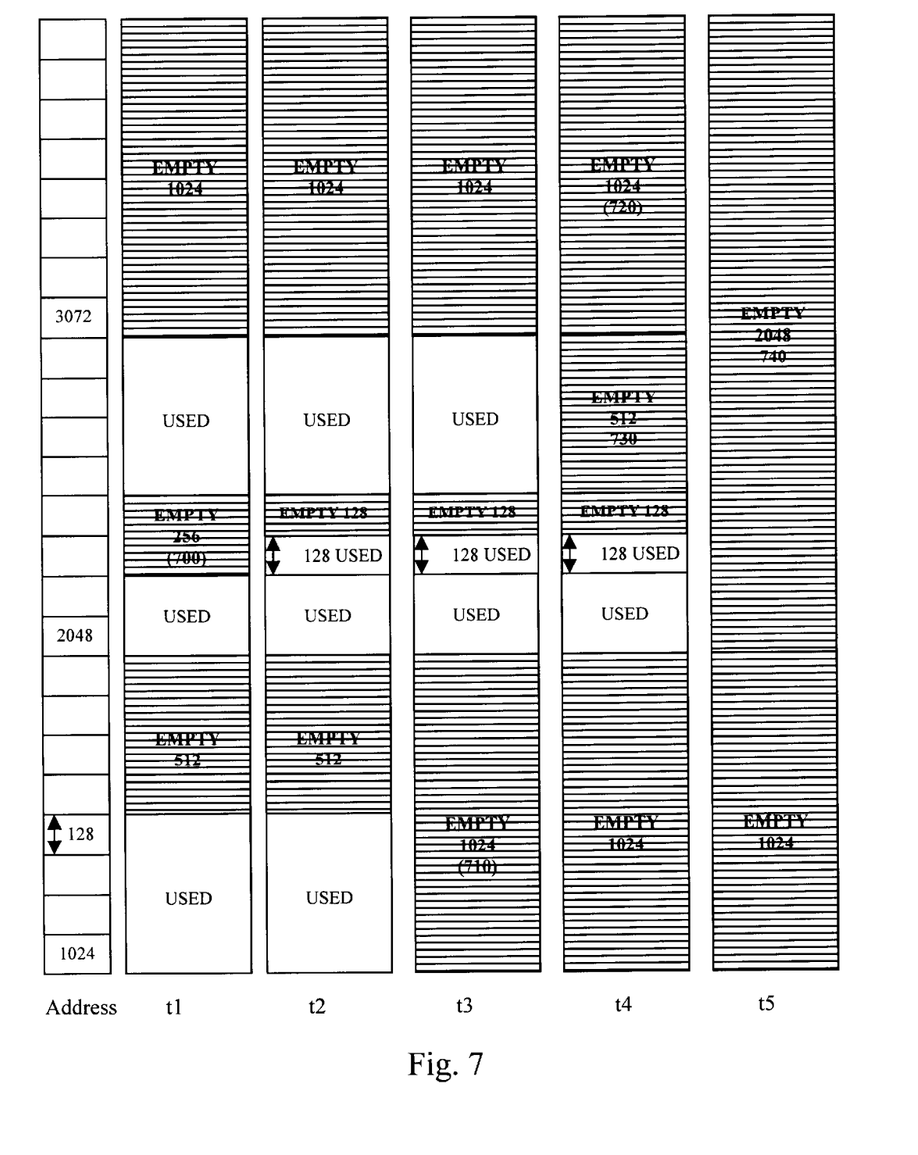
FIG. 7 is a diagram of memory heap management, in accordance with an exemplary embodiment of the present invention.

With reference to FIG. 7 there is illustrated the memory behavior over time. At time slot t1 there are certain used and free memory blocks of various sizes. During time slot t2 there is a need for a 128 byte memory block, and therefore a memory block of 256 bytes is split in to two blocks of 128 bytes each; one that remains free and the other that is now used. In time slot t3 a 512 byte memory block is freed and merged with a similar size block, which is aligned on a boundary address therefore creating the larger free memory block 710. In time slot t4 another 512 byte block 730 is freed by the system. However, this block cannot be merged with any other empty block, as there are none of its size on a boundary address. In time slot t5 both a 128 byte block as well as a 256 byte block are freed. First, the two 128 byte blocks are merged into one 256 byte block. Then, the two 256 byte blocks are merged, followed by the two aligned 512 byte blocks. Finally, one large 2048 byte block 740 is created from the merge of the two free 1024 byte blocks, leaving the system with two free blocks, one of the size of 1024 bytes, starting at address 1024, and the other of the size of 2048 bytes starting at address 2048.

Figure 8:
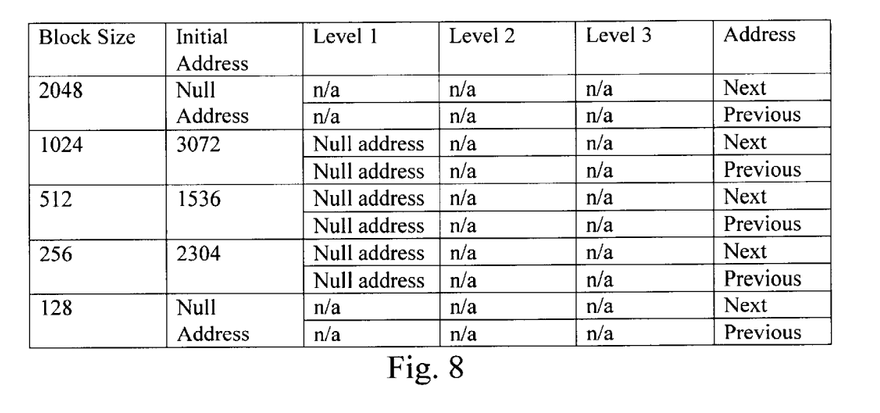
FIG. 8 is an example of the invention's mapping of empty memory at t1, in accordance with an exemplary embodiment of the present invention.
Figure 9:
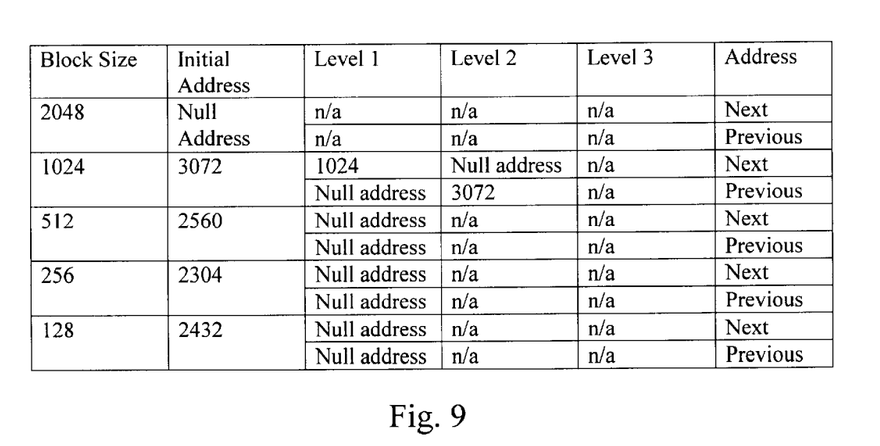
FIG. 9 is an example of the invention's mapping of empty memory at t4, in accordance with an exemplary embodiment of the present invention.

FIGS. 8 and 9 show the memory links existing in the memory in time slots t1 and t4 respectively. It can be clearly seen in FIG. 8 that in t1 there are no blocks of the sizes 2048 bytes and 128 bytes, and there are only one of each of the sizes 1024 bytes, 512 bytes, and 256 bytes. Therefore, in all these cases the headers of the corresponding blocks have in the entry for the "next free block address" and the "previous free block address" the "null address" as explained above. In FIG. 9, one block each of the sizes 512 bytes, 256 bytes and 128 bytes may be observed, and are addressed as explained above. There are two 1024 byte blocks which are linked as explained above. Therefore the "next free block address" of the first free block points to address "1024" and the "previous free block address" of the next block points to the address of the first block at "3072". The first block's "previous free block address" is set to the "null address" and the "next free block address" is also set to the "null address" for reasons explained above.

In an alternative exemplary embodiment of the present invention, the memory to be allocated may be spread throughout a network. In this exemplary embodiment, a free memory resource on one computer may be utilized for the use of a buddy or heap system of another by providing addressing in the block headers which refers to the address in a different machine. For example, where different machines in a LAN are referred to by their IP address, the IP address information of the machine having the next free memory block of the same size would be incorporated into the memory block header destination information of the block being used.

We claim:

1. A computer system for allocating memory comprising:

a CPU for controlling said system;

a local memory for said CPU;

a list accessible to said processing means, said list having at least one entry designating at least one permitted size of free blocks;

means for allocating a plurality of memory blocks for tasks executed on said CPU, wherein said memory blocks are aligned on a boundary address of the block size;

a free memory block header, wherein said free memory block header comprises:
  a free block indicator;
  a block size index;
  a new free block address; and
  a previous free block address, wherein said free block indicator is replaced by said size index of the same block when said block is allocated for user and wherein the smallest available free block is selected for allocation to be used by a new task;

free memory blocks designated by said free memory block header, an allocated block header; and allocated memory blocks designated by said allocated block header, wherein the block is split into new free blocks of equal size if the smallest available free block is more than double the required size for the task.

2. A computer system in accordance with claim 1, wherein the task is assigned to one of the new free blocks of equal size.

3. A computer system in accordance with claim 2, wherein splitting of a block is repeated until the splitting after which the new free blocks of equal cannot both be split into two and still be able to accommodate the memory requirements of the task.

4. A computer system in accordance with claim 1, wherein a list of block sizes is updated to have the null address as the corresponding entry for a new free block size when there are no available new free blocks in the size designated by the new free block size.

5. A computer system in accordance with claim 1, wherein the address of a newly freed block that was previously allocated is entered into the new free block address of the header of the corresponding block size.

6. A computer system in accordance with claim 5, wherein said header of a newly freed block is changed to the header of a free block from that of an allocated block header.

7. A computer system in accordance with claim 6, wherein said size index is copied to the free block header size index position.

8. A computer system in accordance with claim 6 wherein said free block indicator is set to zero.

9. A computer system in accordance with claim 6, wherein the next free block header points to the address of the next available free block of the same size.

10. A computer system in accordance with claim 9, wherein if the block is the last block of that size then the next free block header is changed to the null address.

11. A computer system in accordance with claim 6, wherein the previous free block header is set to the null address.

12. A computer system in accordance with claim 6, wherein the entry in the block size table is set to point to the beginning of the new free block.

13. A computer system for allocating memory comprising:
- a central processing unit (CPU) for controlling said system;
- a local memory for said CPU;
- means for allocating memory blocks comprising aligning blocks of the same size on addresses that are a block size module number away from the initial address to the same size block, to tasks executed on the CPU,
- a free memory block header;
- free memory blocks designated by said free memory block header;
- an allocated block header; and
- allocated memory blocks designated by said allocated block header,
- wherein said free memory block header comprises:
  - a free block indicator;
  - a block size index;
  - a new tree block address, and
  - a previous free block address;
- and wherein said new free block address is a block size module number away from the address of the previous new free block of the same size.

14. A computer system for allocating memory comprising:
- a central processing unit (CPU) for controlling said system;
- a local memory for said CPU;
- means for allocating memory blocks comprising aligning blocks of the same size on addresses that are a block size modulo number away from the initial address to the same size block, to tasks executed on the CPU;
- a free memory block header;
- free memory blocks designated by said free block header;
- an allocated block header; and
- allocated memory blocks designated by said allocated block header,
- wherein said free memory block header comprises:
  - a free block indicator;
  - a block size index;
  - a new free block address, and
  - a previous free block address,
- and wherein said previous free block address is a block size modulo number away from the initial address to the same size block.

* * * * *